US012590836B2

(12) United States Patent
San Roman Alerigi

(10) Patent No.: US 12,590,836 B2
(45) Date of Patent: Mar. 31, 2026

(54) OPTICAL ENERGY APPARATUS, SYSTEMS, AND METHODS

(71) Applicant: Saudi Arabian Oil Company, Dhahran (SA)

(72) Inventor: Damian Pablo San Roman Alerigi, Al-Khobar (SA)

(73) Assignee: Saudi Arabian Oil Company, Dhahran (SA)

( * ) Notice: Subject to any disclaimer, the term of this patent is extended or adjusted under 35 U.S.C. 154(b) by 226 days.

(21) Appl. No.: 18/315,239

(22) Filed: May 10, 2023

(65) Prior Publication Data

US 2024/0377249 A1 Nov. 14, 2024

(51) Int. Cl.
*G01J 1/42* (2006.01)

(52) U.S. Cl.
CPC ................................... *G01J 1/4257* (2013.01)

(58) Field of Classification Search
CPC .......... G01J 1/4257; E21B 7/14; E21B 29/02; E21B 43/11; E21B 2200/22; E21B 47/135
See application file for complete search history.

(56) References Cited

U.S. PATENT DOCUMENTS

| | | | | |
|---|---|---|---|---|
| 4,320,462 | A | * | 3/1982 | Lund ..................... G01J 1/4257 356/73 |
| 8,988,673 | B2 | | 3/2015 | Guttman et al. |
| 9,090,315 | B1 | | 7/2015 | Stone et al. |
| 9,297,737 | B2 | | 3/2016 | Trainer |
| 10,120,336 | B2 | | 11/2018 | Rosen |
| 10,379,493 | B2 | | 8/2019 | Rosen et al. |

(Continued)

FOREIGN PATENT DOCUMENTS

| | | |
|---|---|---|
| WO | WO 2011104644 | 9/2011 |
| WO | WO 2016144646 | 9/2016 |
| WO | WO 2018047111 | 3/2018 |

OTHER PUBLICATIONS

Batarseh et al., "Downhole High-Power Laser Tools Development and Evolutions," Paper, Presented at the Abu Dhabi International Petroleum Exhibition & Conference, Abu Dhabi, UAE, Society of Petroleum Engineers, Nov. 12-15, 2018, 15 pages.

(Continued)

*Primary Examiner* — Thanh Luu
*Assistant Examiner* — Mai Thi Ngoc Tran
(74) *Attorney, Agent, or Firm* — Fish & Richardson P.C.

(57) ABSTRACT

Techniques for operating an optical energy system include operating an optical energy system to generate a laser beam from a laser device, where the optical energy system including an array of sensors radially positioned apart from a path of the laser beam; capturing, with each of the sensors, energy scattered from a transversal energy distribution of the laser beam; outputting, from each of the sensors, an electric current at a value in proportion to the captured energy; aggregating, with a laser control system, the output electric currents from the sensors into a time-dependent array of electric current values; determining, with the laser control system, an anomaly in the laser beam based on at least one of (i) a shape of the laser beam, or (ii) digitized output electric current data from the electric current values; and controlling, with the laser control system, the laser device based on the determined anomaly in the laser beam.

34 Claims, 7 Drawing Sheets

(56)          References Cited

U.S. PATENT DOCUMENTS

| | | |
|---|---|---|
| 11,237,095 B2 | 2/2022 | Rodier et al. |
| 2006/0197943 A1* | 9/2006 | Kewitsch .............. G01J 1/4228 |
| | | 356/73.1 |
| 2009/0185587 A1* | 7/2009 | Koshimae ............. H01S 3/1312 |
| | | 372/22 |
| 2018/0066489 A1* | 3/2018 | Pipchuk .................. E21B 36/04 |
| 2021/0270667 A1 | 9/2021 | Ellmauthaler et al. |

OTHER PUBLICATIONS

Kar et al., "ADIC: Anomaly Detection Integrated Circuit in 65nm CMOS utilizing Approximate Computing," CoRR, Submitted on Aug. 21, 2020, arXiv:2008.09442v1, 12 pages.
Batarseh et al., "Laser Technology for Downhole Applications; Past, Present and Future," SPE-204661-MS, prepared for SPE Middle East Oil & Gas Show and Conference, Manama, Bahrain, Dec. 15, 2021, 10 pages.
International Search Report and Written Opinion in International Appln. No. PCT/US2024/027503, mailed Jul. 23, 2024, 15 pages.

\* cited by examiner

150

X position in Millimeters (Y = Center)

160

Irradiance

Y coordinate value

X coordinate value

Watts/mm^2

OPTICAL ENERGY APPARATUS, SYSTEMS, AND METHODS

TECHNICAL FIELD

This disclosure relates to apparatus, systems, and methods for optical energy and, more particularly, laser systems for wellbores.

BACKGROUND

Remote operations with high-power lasers (HPLs) require continuous monitoring of a laser beam's energy distribution or irradiance shape, and the integrity of the optical package. Typically, partially transparent prisms have been used to direct a portion of the beam to power and beam characterization sensors out of the main (process) path. This arrangement is useful and viable in tools where the process beam needs to be reflected as part of the beam path design; e.g. a 90-degree bend to direct the beam through a lateral exit. However, this setup is unfeasible in linear tools or in designs where prisms may be inadequate.

SUMMARY

In an example implementation, an optical energy system includes a laser device configured to output a laser beam; an array of a plurality of sensors radially positioned apart from a path of the laser beam, where each of the plurality of sensors is configured to capture energy scattered from a transversal energy distribution of the laser beam and output an electric current at a value in proportion to the captured energy; and a control system communicably coupled to each of the sensors. The controller is configured to perform operations including aggregating the output electric currents from the plurality of sensors into a time-dependent array of electric current values; determining an anomaly in the laser beam based on at least one of (i) a shape of the laser beam, or (ii) digitized output electric current data from the electric current values; and controlling the laser device based on the determined anomaly in the laser beam.

In an aspect combinable with the example implementation, each sensor includes a photo-transducer and an optical coupler.

In another aspect combinable with any of the previous aspects, each sensor further includes an optical fiber.

In another aspect combinable with any of the previous aspects, the operations include digitizing the output electric currents from the plurality of sensors to form the digitized output electric current data.

In another aspect combinable with any of the previous aspects, the time-dependent array of electric current values further includes location values associated with the plurality of sensors.

In another aspect combinable with any of the previous aspects, the operations include determining the shape of the laser beam.

In another aspect combinable with any of the previous aspects, the operation of determining the shape of the laser beam includes inputting the digitized output electric current data into a Helmholtz solver; determining the shape of the laser beam by solving, with the Helmholtz solver, the Helmholtz equation subject to boundary values based on the transversal energy distribution of the laser beam; and based on a comparison of the boundary values differing from previous boundary values exceeding a threshold value, determining the anomaly in the laser beam based on the shape of the laser beam.

In another aspect combinable with any of the previous aspects, the operations include comparing the digitized output electric current data from the electric current values taken at a first time to digitized output electric current data from the electric current values taken at a second time prior to the first time; and based on the comparison exceeding a threshold value, determining the anomaly in the laser beam based on the digitized output electric current data from the electric current values.

In another aspect combinable with any of the previous aspects, the operations include determining no anomaly in the laser beam; and based on the determination of no anomaly, maintaining operation of the laser device to output the laser beam.

In another aspect combinable with any of the previous aspects, the laser device includes a linear laser device.

In another example implementation, a method for operating an optical energy system includes operating an optical energy system to generate a laser beam from a laser device, the optical energy system including an array of a plurality of sensors radially positioned apart from a path of the laser beam; capturing, with each of the plurality of sensors, energy scattered from a transversal energy distribution of the laser beam; outputting, from each of the plurality of sensors, an electric current at a value in proportion to the captured energy; aggregating, with a laser control system, the output electric currents from the plurality of sensors into a time-dependent array of electric current values; determining, with the laser control system, an anomaly in the laser beam based on at least one of (i) a shape of the laser beam, or (ii) digitized output electric current data from the electric current values; and controlling, with the laser control system, the laser device based on the determined anomaly in the laser beam.

In an aspect combinable with the example implementation, each sensor includes a photo-transducer and an optical coupler.

In another aspect combinable with any of the previous aspects, each sensor further includes an optical fiber.

Another aspect combinable with any of the previous aspects further includes digitizing, with the laser control system, the output electric currents from the plurality of sensors to form the digitized output electric current data.

In another aspect combinable with any of the previous aspects, the time-dependent array of electric current values further includes location values associated with the plurality of sensors.

Another aspect combinable with any of the previous aspects further includes determining, with the laser control system, the shape of the laser beam.

In another aspect combinable with any of the previous aspects, determining the shape of the laser beam includes inputting, with the laser control system, the digitized output electric current data into a Helmholtz solver; determining, with the laser control system, the shape of the laser beam by solving, with the Helmholtz solver, the Helmholtz equation subject to boundary values based on the transversal energy distribution of the laser beam; and based on a comparison of the boundary values differing from previous boundary values exceeding a threshold value, determining, with the laser control system, the anomaly in the laser beam based on the shape of the laser beam.

Another aspect combinable with any of the previous aspects further includes comparing, with the laser control system, the digitized output electric current data from the electric current values taken at a first time to digitized output electric current data from the electric current values taken at a second time prior to the first time; and based on the comparison exceeding a threshold value, determining, with the laser control system, the anomaly in the laser beam based on the digitized output electric current data from the electric current values.

Another aspect combinable with any of the previous aspects further includes determining, with the laser control system, no anomaly in the laser beam; and based on the determination of no anomaly, maintaining operation of the laser device to output the laser beam.

In another aspect combinable with any of the previous aspects, the laser device includes a linear laser device.

Implementations of an optical energy system according to the present disclosure may include one or more of the following features. For example, implementations according to the present disclosure can enable a contactless inference of a laser beam's energy distribution. As another example, implementations according to the present disclosure can be used to detect irregularities and/or anomalies caused by defects in the optical elements or path of the laser beam. For example, implementations according to the present disclosure can utilize off-axis detectors to acquire information about the beam properties via Rayleigh scattered light. Implementations according to the present disclosure can also significantly reduce or eliminate catastrophic failure of an optical assembly, optical couplers, optical fibers, and laser sources in high-power laser tools. As another example, implementations according to the present disclosure can include arrays of sensing elements distributed along the tool at the input and output of every (critical) optical element.

The details of one or more implementations of the subject matter described in this disclosure are set forth in the accompanying drawings and the description below. Other features, aspects, and advantages of the subject matter will become apparent from the description, the drawings, and the claims.

DETAILED DESCRIPTION

The present disclosure describes example implementations of an optical energy system, such as a laser system that is operable, in some aspects, as a downhole laser tool. For instance, example implementations of an optical energy system can be used as a downhole laser drilling tool, a downhole laser fracturing tool, a downhole laser perforating tool, or otherwise. Example implementations of an optical energy system according to the present disclosure can also be used as a laser de-scaling tool or a laser heat treatment tool. In some aspects, the optical energy system includes an array of sensors disposed around a path of a laser beam output from the system. The array of sensors can capture energy scattered from a tail-end of the beam's transversal energy distribution. The array of sensors can output a current (from each sensor) that is processed and used to identify, for example, asymmetries and anomalies in the laser beam, as well as a shape of the energy distribution of the laser beam (in other words, its irradiance). With such characteristics identified, the optical energy system can be controlled to adjust the laser beam output.

Figure 1A:
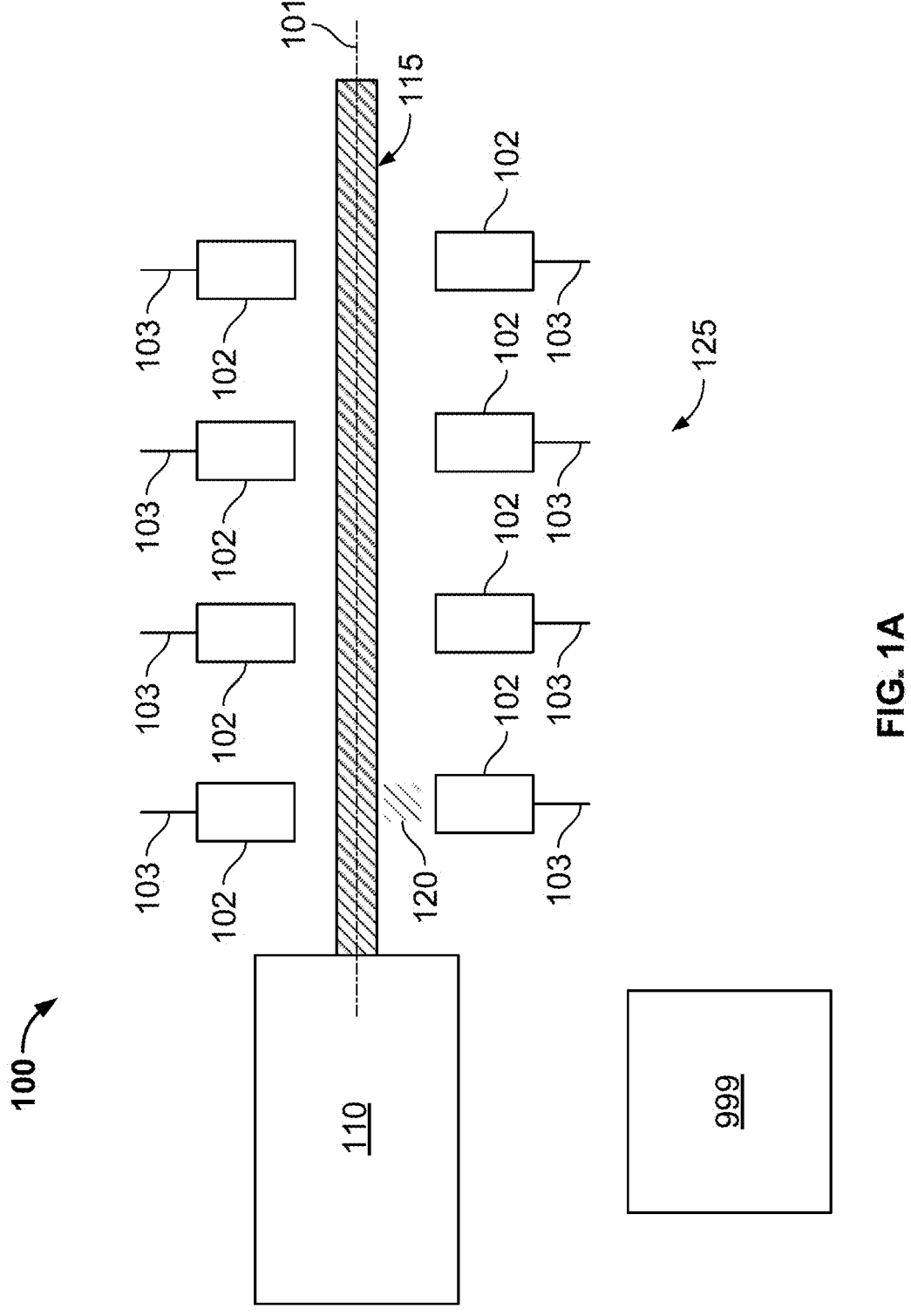
FIGS. 1A and 1B are schematic diagrams of an example implementation of an optical energy system according to the present disclosure.
Figure 1B:
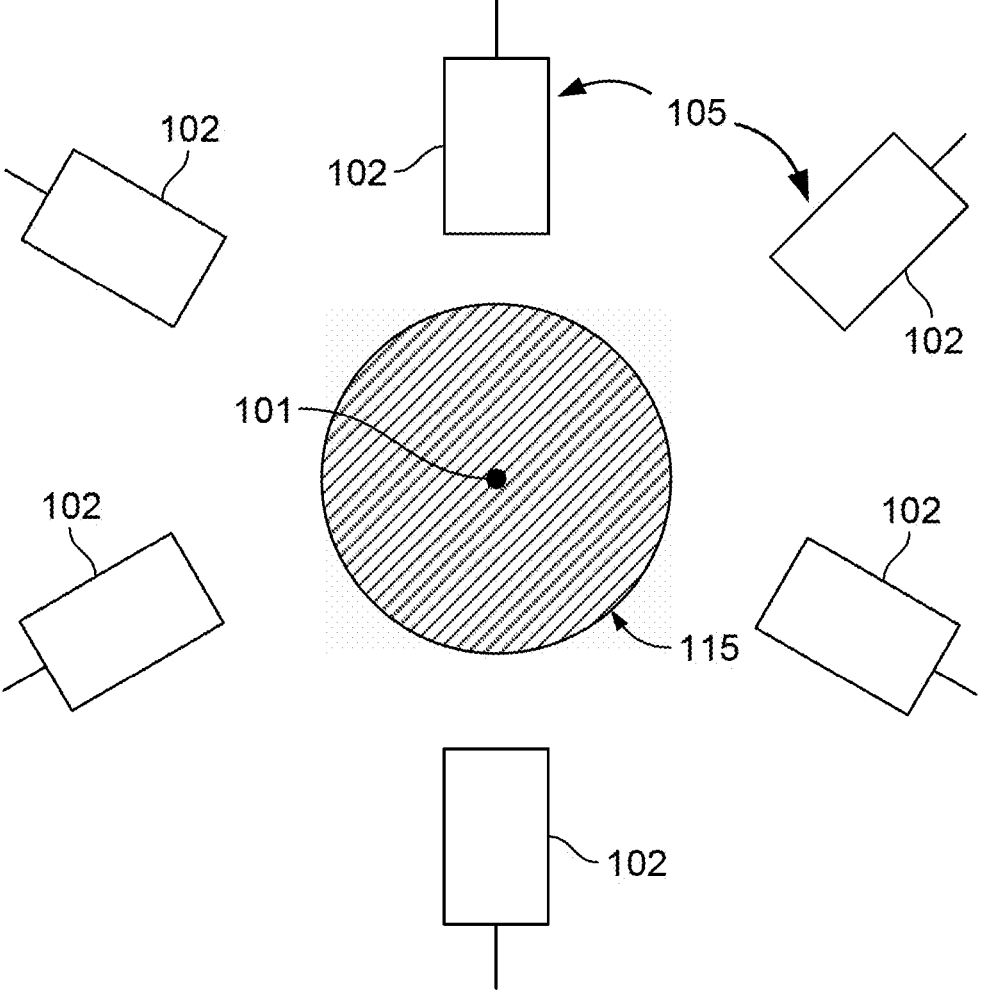

FIGS. 1A and 1B are schematic diagrams of an example implementation of an optical energy system 100 according to the present disclosure. As shown in FIG. 1A, optical energy system 100 includes a laser device 110 that outputs a laser beam 115. In some aspects, the laser device 110 is a linear laser device such that the laser beam 115 is not reflected or a portion of the beam 115 is not redirected through one or more prisms.

Figures 1C, 1D:
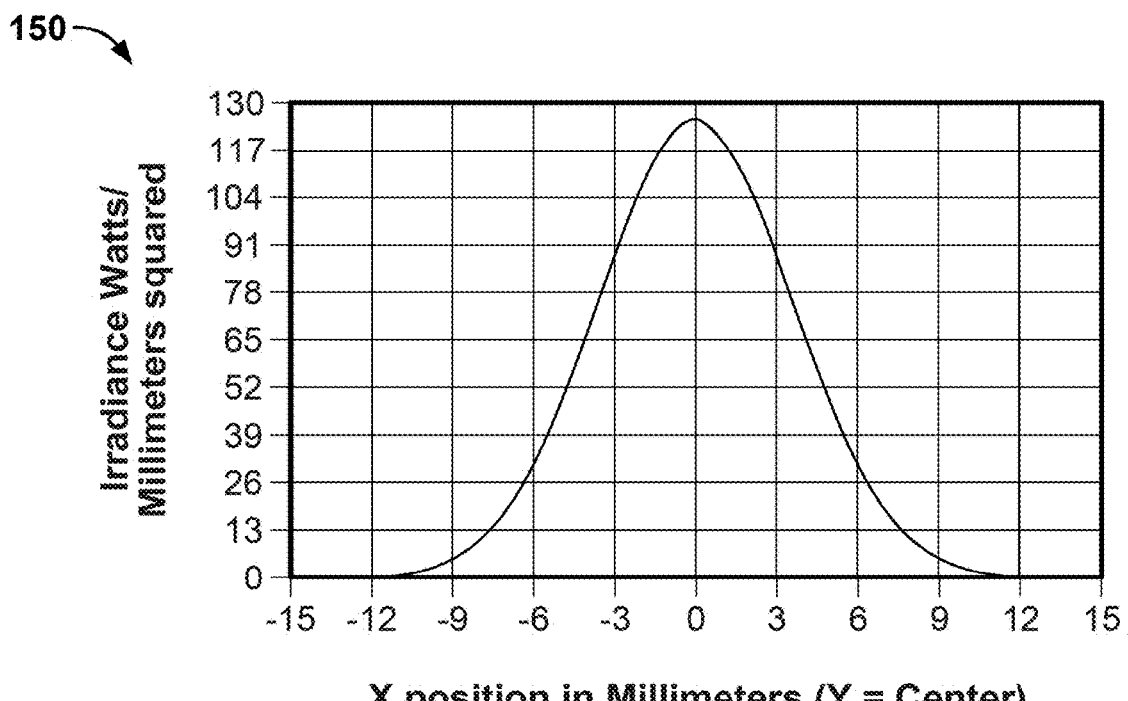
FIGS. 1C and 1D are graphs that illustrate optical energy output of a laser system according to the present disclosure.

Turning briefly to FIGS. 1C and 1D, these figures show graphs 150 and 160, respectively, that illustrate optical energy output of a laser system such as optical energy system 100 according to the present disclosure. Graph 150 shows a radial density distribution of the laser beam 115, with a y-axis that represents irradiance in watts per squared meters and an x-axis that represents radial distance in millimeters from a center of the laser beam 115. Graph 160 shows a transversal energy distribution heat map of irradiance (by color scale) according to x-y coordinate position in the laser beam 115. The Huygens-Fresnel-Kirchhoff's principle states that every point in a wavefront is a dipole source of electromagnetic radiation. This physical fact implies the self-scattering of any light source, including laser beams (such as laser beam 115). In particular for lasers with a Gaussian profile, the HFK principle yields a minimum angle of divergence for a laser beam based on its wavelength ($\lambda$) and beam waist or radius ($w_o$) as: $\lambda(\pi w_o)$.

As shown in FIG. 1A, the optical energy system 100 includes an array 125 of sensors 102 where the sensors 102 are positioned about the laser beam 115 but out of the path of the laser beam 115. In some aspects, each sensor 102 comprises a CMOS (complementary metal-oxide semiconductor) or CCD (charged coupled device) sensor that is or acts as a photo-transducer. Each sensor 102 can therefore capture scattered photons from a tail-end of the laser beam 115 and produce (as an output) a photo-current. As explained in more detail herein, the output photo-current (from each sensor 102) can be digitized and analyzed to determine a shape and one or more anomalies of the laser beam 115.

As shown in FIG. 1A, the array 125 includes multiple sensors 102; as shown, eight sensors 102. However, alternative implementations can include more or fewer sensors 102 in the array 125. The sensors 102 can be arranged radially adjacent a path of the laser beam 115 (in other words, radially adjacent but spaced away from an axis 101 of the laser beam 115). For example, FIG. 1B shows an end view of the optical energy system 100 with the sensors 102 positioned apart from the axis 101 and about the laser beam 115. As shown in FIG. 1B, each sensor 102 is radially spaced apart from at least one other sensor 102. In some aspects, a radial spacing 105 between adjacent can be, for example, 45 degrees or other radial spacing.

As shown in FIG. 1A, the optical energy system 100 includes a laser control system 999 that is communicably coupled to the sensors 102 through connectors 103 (for example, one per sensor 102). The connectors 103 can be, for example, fiber optic connectors or other connectors that provide an output (for example, current) of the sensor 102 to the laser control system 999. In some aspects, the laser control system 99 comprises a micro-processor based controller that processes, amplifies, converts, or otherwise modifies the output electric current from the sensors 102 for analysis, such as described with reference to FIG. 2.

As shown in FIGS. 1A and 1B, the array 125 of sensors 102 are disposed around the path of laser beam 115 such that each sensor 102 captures energy 120 scattered from tail-ends of the beam's transversal energy distribution. The sensor 102 and connector 103, which can include an optical coupler, operate to focus the scattered energy 120 to either a photo-transducer or an optical fiber. In the latter option, the photo-transducers are located either within the sensor 102 or in a remote sensor box. In some aspects, optical fibers may be preferred when using larger or cooled photo-transducers (for example, APDs, GaAs, etc.). The output current of each photo-transducer (pixel) can then be used by the laser control system 999 to identify asymmetries and anomalies in the laser beam 115 and infer the transversal shape or energy distribution of laser beam 115.

An optical package of the sensor 102 (the optical coupler) can be fitted with one or more filters, such as optical density (OD) to decrease the scattered intensity, and interference or bandpass filter (IF) to block ambient or back-scattered light at a frequency different than the laser beam 115. Generally, each sensor 102 (for example, each photo-sensor) generates an electric current ($q_i$) in response to the intensity of the light, which can be digitized ($x_i$) and combined in a 1D array $X=(x_1, x_2, \ldots, x_n)$ by the laser control system 999, with n as the number of sensors 102.

An output from the laser control system 999 can include the acquisition time or timestamp ($t_m$) and an identifier (k) of the sensor 102 in the array 125. An expanded 1D array has the form (k, $t_m$,; X). The laser control system 999 can store (for example, in permanent memory) a separate array detailing the physical position of each sensor 102 with respect to the optical axis 101 of the tool 101 for each sensor array installed for the laser device 110. This position array has the form (k, $\vec{r}_{k,i}$), where the subscript denotes the i-th sensor 102 in the sensor array 125, k. The laser control system 999 can store a time-lapse by concatenating row-wise some or all the measurements. This 2D array has m rows (acquisitions or measurement events) and n+2 columns (sensor array label, timestamp, n-measurements). The instantaneous (1D array) or combined 2D array can then be used to detect anomalies or find the beam shape through, for example, the process workflow of FIG. 2.

In some aspects, neural engines at the edge (for example, U-Net) or in-silico can be used to detect anomalies and find the beam shape. In-silico anomaly detection can be attained by using CMOS integrated circuits. The beam shape can also be found by solving the Helmholtz equation subject to the boundary conditions given by the photocurrents as described with reference to FIG. 2. In some aspects, for example, depending on the laser application, different neural network architectures can be employed. The selection of a particular neural network architecture includes classifiers for anomaly detection and beam shape (for example, a network can be trained to take an input 1D array and infer the beam shape type, such as Gauss, Laguerre, etc.). Direct calculation using the Helmholtz equation or a dense neural network can be used to determine the transversal energy of the beam 115. The former (using the Helmholtz equation) can be a straightforward solver to a partial differential equation. The latter (dense neural network) involves training a physics-informed neural network to solve the Helmholtz equation. There are multiple architectures for PIMLs, with U-Net being just an example.

Figure 1E:
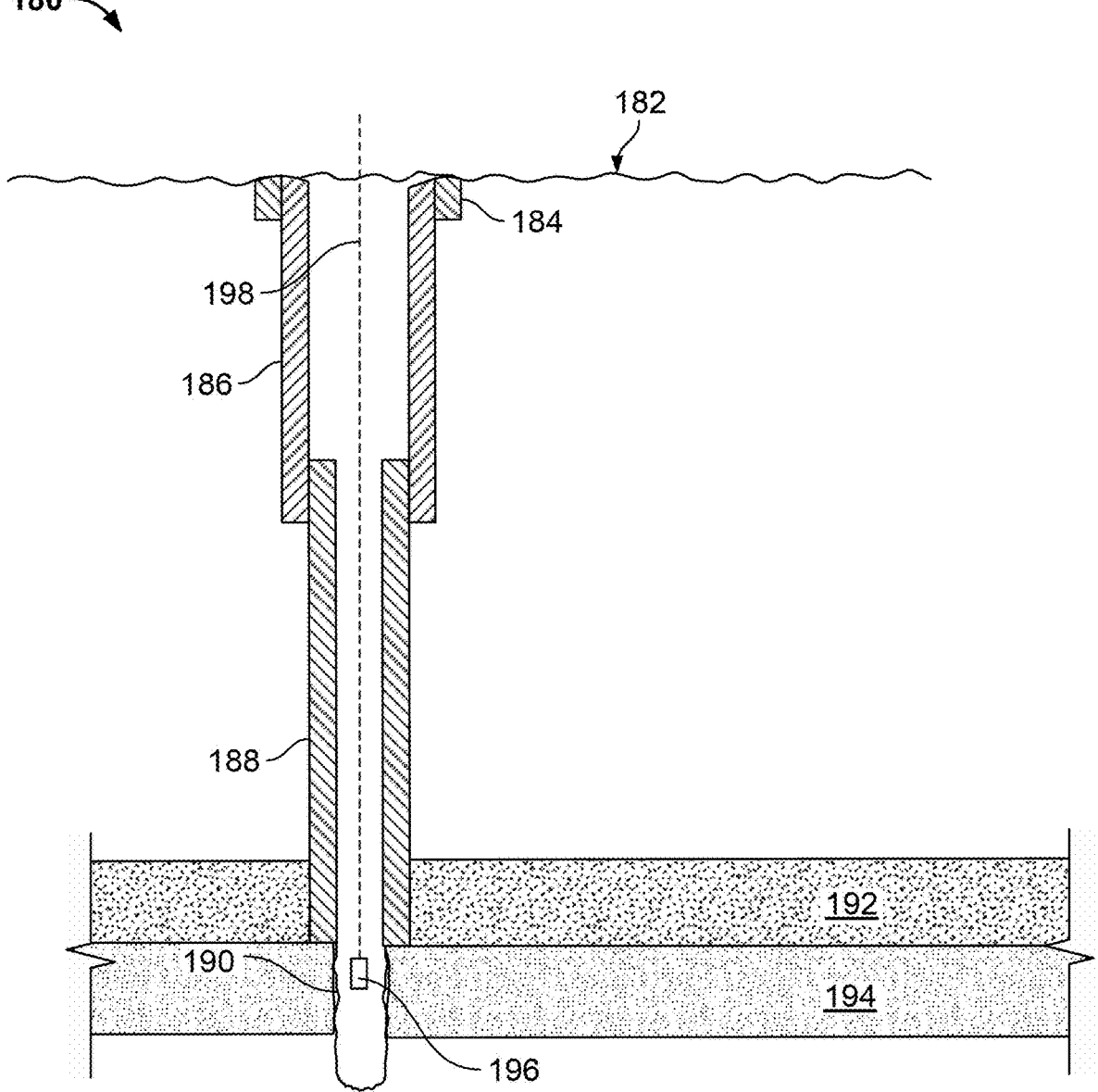
FIG. 1E is a schematic diagram of an example implementation of a downhole laser system according to the present disclosure.

FIG. 1E is a schematic diagram of an example implementation of a downhole laser system 196 according to the present disclosure. As shown in FIG. 1E, the downhole laser system 196 can comprise all or a part of optical energy system 100 and be implemented as a downhole tool in wellbore 190 of wellbore system 180. Downhole laser system 196 can be implemented in wellbore system 180 as a laser drilling tool, a laser perforating tool, a laser fracturing tool, or other downhole laser tool.

Wellbore 190 is formed from a terranean surface 182 to one or more subterranean formations 192 and 194 (as examples). Although illustrated as vertical, the wellbore 190 can be offset from vertical (for example, a slant wellbore), a directional wellbore, a horizontal wellbore, or combinations of several of these types of wellbore. For example, the wellbore 190 can be a stepped wellbore, such that a portion is drilled vertically downward and then curved to a horizontal wellbore portion. The horizontal wellbore portion can then be turned downward to a second substantially vertical portion, which is then turned to a second substantially horizontal wellbore portion. Additional vertical and horizontal wellbore portions can be added according to, for example, the type of terranean surface 182, the depth of one or more target subterranean formations, or the depth of one or more productive subterranean formations, or a combination of both.

Wellbore system 180 can be implemented on a body of water rather than the terranean surface 182. For instance, in some embodiments, the terranean surface 182 may be below an ocean, gulf, sea, or any other body of water under which hydrocarbon-bearing formations may be found. In short, reference to the terranean surface 182 includes both land and underwater surfaces and contemplates forming or developing one or more wellbores from either or both locations.

As shown, the wellbore system 180 accesses one or more subterranean formations 192 and 194 to produce hydrocarbons located in such subterranean formations. One or more wellbore casings, such as a conductor casing 184, a surface casing 186, and production casing 188, and may be installed in at least a portion of the wellbore 190.

Downhole laser system 196 is coupled to a downhole conveyance 198, which can be a slickline, wireline, or other conveyance that, for instance, can provide electrical power to the downhole laser system 196. When positioned within the wellbore 190 at a particular position (in other words, depth), the downhole laser system 196 can be operated to perform one or more laser operations.

Figure 2:
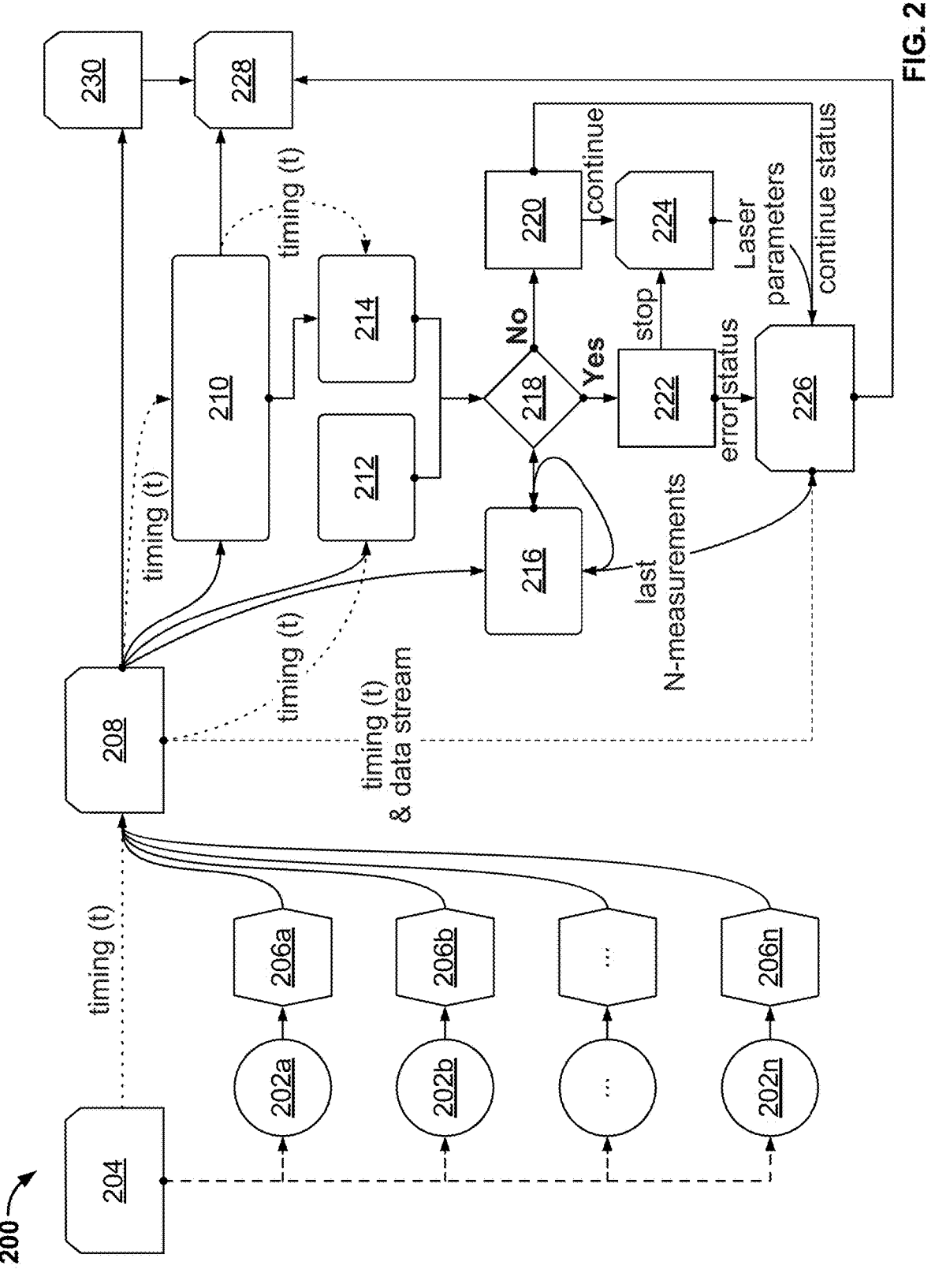
FIG. 2 is a schematic diagram of a workflow of an optical energy system according to the present disclosure.

FIG. 2 is a schematic diagram of a workflow 200 of the optical energy system 100 according to the present disclosure. Workflow 200 includes measuring or collecting electric current signals 202a through 202n from sensors 102. In this example, "n" can be a variable number which corresponds to the number of sensors 102 positioned about the laser beam 115. Each sensor 102, can measure or collect a transversal energy distribution of the laser beam 115 and output an electric current 202a-202n at a value in proportion to the captured energy. As shown in this example, a timer or clock 204 can provide a trigger or clock signal to synchronize the measurement or capture of the electric signals 202a-202n. For example, in some aspects, each sensor 102 is synchronized by the clock 204 (in other words, a timing signal) to measure or collect the transversal energy distribution of the laser beam 115 at the same time as each other sensor 102. This timing signal or timestamp from the clock 204 can also be provided to other sub-processes of the workflow as described herein.

The electric currents 202a-202n can then be transformed in an analog-to-digital converter to digital electric current values 206a-206n. These digital electric current values 206a-206n are then combined into a 1D array of values by a combiner 208. In this example, the timing signal from the clock 204 is also provided to the combiner 208 to form a time-referenced 1D array (in other words, a 2D array) of the digital electric current values 206a-206n by the combiner 208.

Figure 3A:
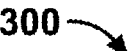
FIGS. 3A and 3B are graphs that illustrate particular steps in the workflow of FIG. 3 according to the present disclosure.
Figure 3A:
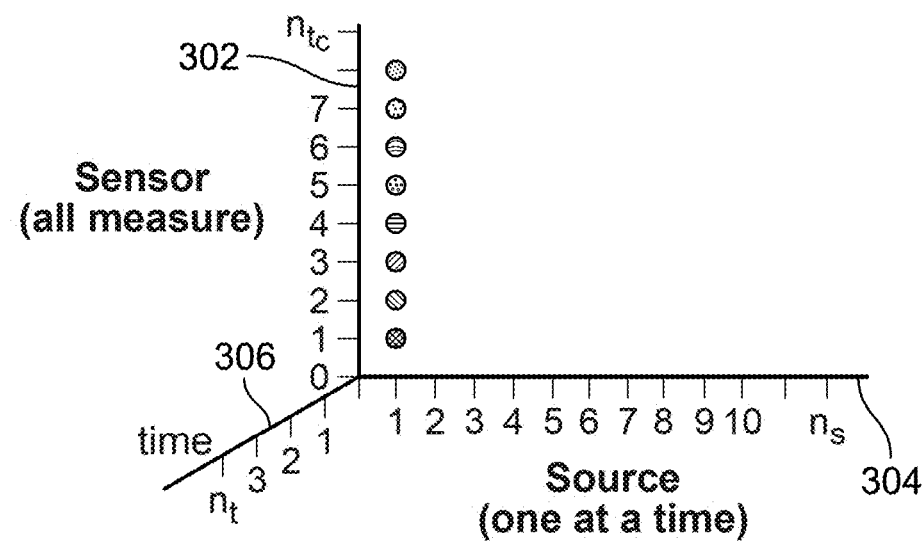

For example, the combiner 208 can, for each time step in the time sequence, unroll the electric current value data to build a 2D representation of the data stacked in time as shown in graph 300 of FIG. 3A. Graph 300 shows a graphical representation of unrolling the data for multiple sensing arrays, with the y-axis 302 representing array number (1 . . . k), the x-axis 304 representing sensor number (1 . . . n), and t-axis representing the timestamps (0 . . . m). The dots in greyscale represent the "amplitude," or intensity of the signal in a greyscale mapping. In some aspects, if there is only a single array 125, then graph 300 has a single slice in the y-axis 302.

Figure 3B:
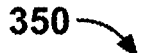
Figure 3B:
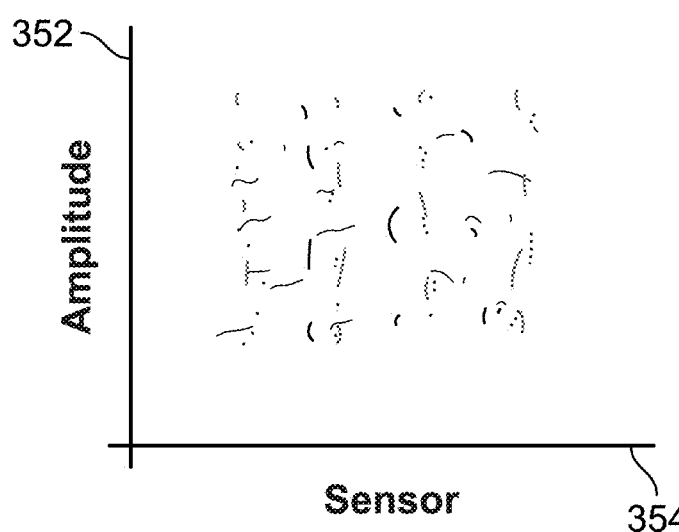

Graph 350 of FIG. 3B is a representation of a measurement taken at a particular timestamp. In graph 350, the y-axis 352 represents amplitude of the measured current (in other words, intensity). The x-axis 354 represent sensor number (1 . . . n). The data of graph 300 (within some time interval defined by the user) is used to identify and predict anomalies. Typically, the interval can be the current timestamp and the last P measurements (time-wise). The number of measurements in memory (P) determines the size of a buffer of the laser control system 999. Additionally, the user can decide to create additional features by computing time-weighted averages or any other feature engineering for time analysis.

Continuing with the workflow 200, the 2D array of the digital electric current values 206a-206n is also provided to a logger 226 (among other data) for data logging during the workflow 200. The 2D array of the digital electric current values 206a-206n can also be provided to a formatter 230 that prepares this data to be shown to an operator of the laser control system 999 on a graphical user interface 232 (for example, a computer display device).

As shown in this example workflow, the timing sequence and 1D array of the digital electric current values 206a-206n are provided to a solver 210 (represented graphically in FIG. 3B). In some aspects, the solver 210 is or includes a Helmholtz solver that executes the Helmholtz equation subject to the boundary conditions given by the photocurrents sensed by the sensors 102. For example, the Helmholtz solver solves the partial differential equation:

$$\nabla^2 \psi + k^2 \psi = 0,$$

where k are the electromagnetic properties of the propagation volume and the boundary conditions are $\psi(r=R)-X$.

The solver 210 determines a shape of the laser beam 115 based on, for example, the output of the Helmholtz equation using the timing sequence and 1D array of digital electric current values 206a-206n. The beam shape, as shown, can be provided to the graphical user interface 232 for visualization by the operator.

The beam shape can then be analyzed for anomalies by a beam anomaly detector 214. The beam anomaly detector 214 analyzes the beam shape based on the boundary values determined by the solver 210 and compares such values to previous (in other words, prior in time) boundary values from the solver 210 (stored in a buffer). Should the compared values vary more than a particular threshold, an anomaly determiner 218 can determine whether or not the laser beam 115 has an anomaly (based on the intensity distribution and shape).

In series or in parallel with the solver 210, the timing sequence and 2D array of the digital electric current values 206a-206n are also provided to a data anomaly detector 212 (which can be a coherence measurement, neural network classifier, boosting classifier, or a threshold different alarm). In some aspects, the anomaly detector 212 analyzes the raw digital data (in other words, the time-wise stacked 1D arrays of the digital electric current values 206a-206n) outside of the solver 210 and compares this raw digital data with previous (in other words, prior in time) raw digital data values (stored in a buffer). Should the compared values vary more than a particular threshold, the anomaly determiner 218 can determine whether or not the laser beam 115 has an anomaly (based on the raw data rather than determined shape). In some aspects, an anomaly in the raw digital electric current values 206a-206n can also signify an error or malfunction in one or more of the sensors 102.

In series or in parallel with the solver 210 and the data anomaly detector 212, the 1D array of the digital electric current values 206a-206n can also be provided to a signal comparator 216. The signal comparator 216 can analyze a short time period (for example, 1-2 seconds) of the raw digital electric current values 206a-206n for coherence with previous raw digital data. Should such comparison reveal differences that exceed a threshold value, the anomaly determiner 218 can determine that the laser beam 115 has an anomaly that was not detected through the solver 210 or the data anomaly detector 212. In some aspects, determination of an anomaly through the signal comparator 216 can also indicate a malfunction with one or more sensors 102.

Should no anomaly in the laser beam 115 be determined by the anomaly determiner 218, a command 220 can be provided to a laser device trigger 224 to remain open (in other words, continue to generate the laser beam 115 with the laser device 110. This command 220 can also be logged at the logger 226 (with a time reference as well in some aspects). The laser device trigger 224 can also provide operating parameters of the laser device 110 to the logger 226 (for example, at a time value of the command 220).

Should an anomaly be determined in the laser beam 115 by the anomaly determiner 218, a command 22 can be provided to the laser device trigger 224 to stop generating the laser beam 115 with the laser device 110. This command 222 can also be logged at the logger 226 (with a time reference as well in some aspects). The laser device trigger 224 can also provide operating parameters of the laser device 110 to the logger 226 (for example, at a time value of the command 222). The command 222, when logged at the logger 226, can include data on the anomaly, such as whether the anomaly was detected in the shape of the laser beam 115, the raw digital electric current values 206a-206n, or due to some other malfunction, such as by a sensor 102.

The logger 226 can log and store (at least transiently), data such as the timing sequence, the 1D array of digital electric current values, laser operating parameters, status and time of commands 220 and/or 222, and error status, as examples. The logged data can be provided to the graphical user interface 232 for visualization by the operator.

Figure 4:
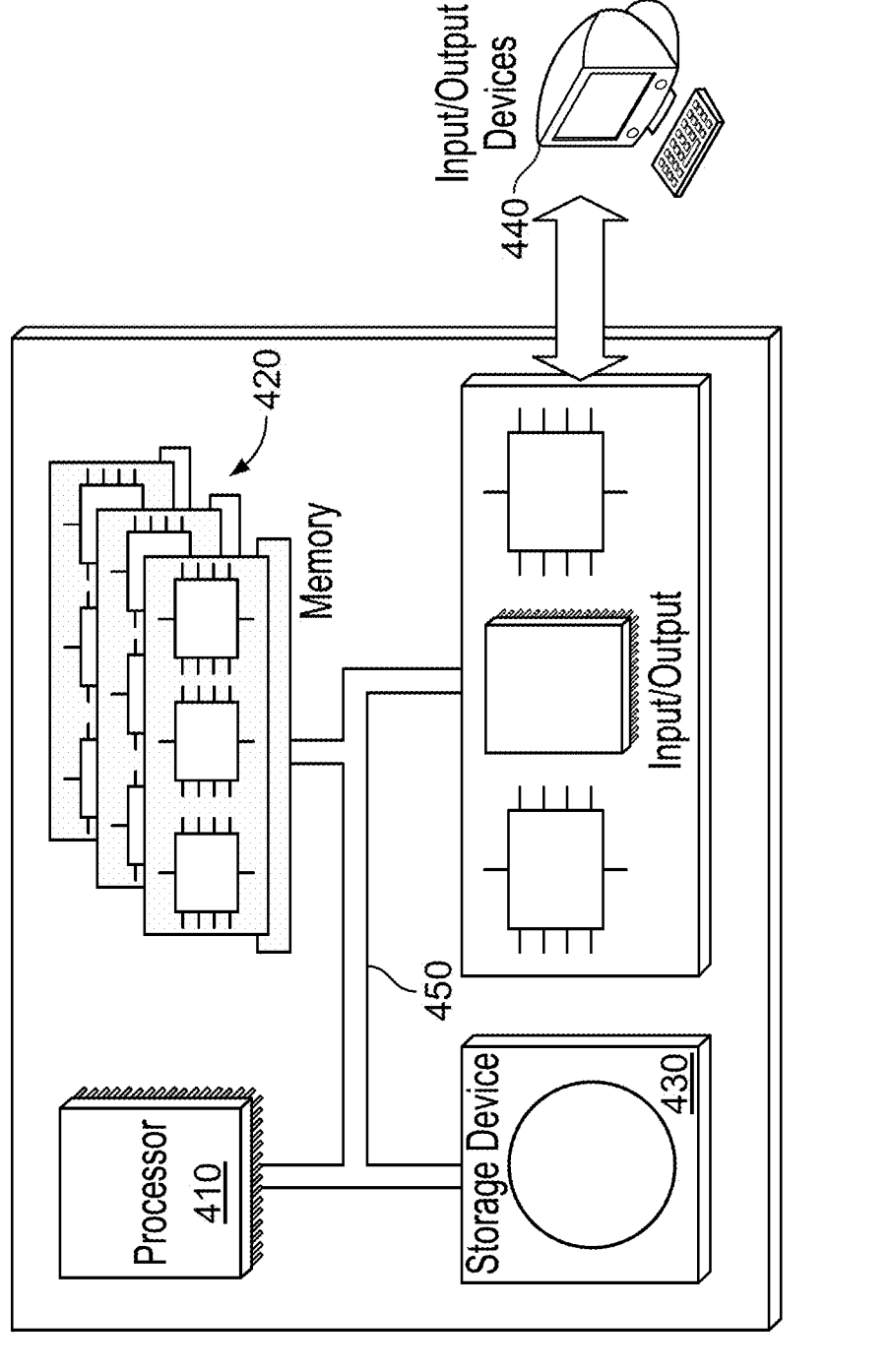
FIG. 4 is a schematic illustration of an example optical energy control system according to the present disclosure.

FIG. 4 is a schematic illustration of an example optical energy control system 400 for controlling operations of an optical energy system according to the present disclosure. For example, the control system 400 may include or be part of the laser control system 999 shown in FIG. 1A to implement the example workflow 200 of FIG. 2. The control system 400 is intended to include various forms of digital computers, such as printed circuit boards (PCB), processors, digital circuitry, or otherwise parts of a biocide testing system. Additionally, the system can include portable storage media, such as, Universal Serial Bus (USB) flash drives. For example, the USB flash drives may store operating systems and other applications. The USB flash drives can include input/output components, such as a wireless transmitter or USB connector that may be inserted into a USB port of another computing device.

The control system 400 includes a processor 410, a memory 420, a storage device 430, and an input/output device 440. Each of the components 410, 420, 430, and 440 are interconnected using a system bus 450. The processor 410 is capable of processing instructions for execution within the control system 400. The processor may be designed using any of a number of architectures. For example, the processor 410 may be a CISC (Complex Instruction Set Computers) processor, a RISC (Reduced Instruction Set Computer) processor, or a MISC (Minimal Instruction Set Computer) processor.

In one implementation, the processor 410 is a single-threaded processor. In another implementation, the processor 410 is a multi-threaded processor. The processor 410 is capable of processing instructions stored in the memory 420 or on the storage device 430 to display graphical information for a user interface on the input/output device 440.

The memory 420 stores information within the control system 400. In one implementation, the memory 420 is a computer-readable medium. In one implementation, the memory 420 is a volatile memory unit. In another implementation, the memory 420 is a non-volatile memory unit.

The storage device 430 is capable of providing mass storage for the control system 400. In one implementation, the storage device 430 is a computer-readable medium. In various different implementations, the storage device 430 may be a floppy disk device, a hard disk device, an optical disk device, or a tape device.

The input/output device 440 provides input/output operations for the control system 400. In one implementation, the input/output device 440 includes a keyboard and/or pointing device. In another implementation, the input/output device 440 includes a display unit for displaying graphical user interfaces.

The features described can be implemented in digital electronic circuitry, or in computer hardware, firmware, software, or in combinations of them. The apparatus can be implemented in a computer program product tangibly embodied in an information carrier, for example, in a machine-readable storage device for execution by a programmable processor; and method steps can be performed by a programmable processor executing a program of instructions to perform functions of the described implementations by operating on input data and generating output. The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors of any kind of computer. Generally, a processor will receive instructions and data from a read-only memory or a random access memory or both. The essential elements of a computer are a processor for executing instructions and one or more memories for storing instructions and data. Generally, a computer will also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the features can be implemented on a computer having a display device such as a CRT (cathode ray tube) or LCD (liquid crystal display) monitor for displaying information to the user and a keyboard and a pointing device such as a mouse or a trackball by which the user can provide input to the computer. Additionally, such activities can be implemented via touch-screen flat-panel displays and other appropriate mechanisms.

The features can be implemented in a control system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include a local area network ("LAN"), a wide area network ("WAN"), peer-to-peer networks (having ad-hoc or static members), grid computing infrastructures, and the Internet.

While this specification contains many specific implementation details, these should not be construed as limitations on the scope of any inventions or of what may be claimed, but rather as descriptions of features specific to particular implementations of particular inventions. Certain features that are described in this specification in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

A number of implementations have been described. Nevertheless, it will be understood that various modifications may be made without departing from the spirit and scope of the disclosure. For example, example operations, methods, or processes described herein may include more steps or fewer steps than those described. Further, the steps in such example operations, methods, or processes may be performed in different successions than that described or illustrated in the figures. Accordingly, other implementations are within the scope of the following claims.

What is claimed is:

1. An optical energy system, comprising:
a laser device configured to output a laser beam;
an array of a plurality of sensors radially positioned apart from a path of the laser beam, each of the plurality of sensors configured to capture energy scattered from a transversal energy distribution of the laser beam and output an electric current at a value in proportion to the captured energy; and
a control system communicably coupled to each of the sensors and configured to perform operations comprising:
aggregating the output electric currents from the plurality of sensors into a time-dependent array of electric current values;
determining the shape of the laser beam, the determining comprising:
inputting the digitized output electric current data into a Helmholtz solver;
determining the shape of the laser beam by solving, with the Helmholtz solver, a Helmholtz equation subject to boundary values based on the transversal energy distribution of the laser beam; and
based on a comparison of the boundary values differing from previous boundary values exceeding a threshold value, determining the anomaly in the laser beam based on the shape of the laser beam;
determining an anomaly in the laser beam based on at least one of (i) the shape of the laser beam, or (ii) digitized output electric current data from the electric current values; and
controlling the laser device based on the determined anomaly in the laser beam.

2. The optical energy system of claim 1, wherein each sensor comprises a photo-transducer and an optical coupler.

3. The optical energy system of claim 2, wherein each sensor further comprises an optical fiber.

4. The optical energy system of claim 1, wherein the operations comprise digitizing the output electric currents from the plurality of sensors to form the digitized output electric current data.

5. The optical energy system of claim 1, wherein the time-dependent array of electric current values further comprises location values associated with the plurality of sensors.

6. The optical energy system of claim 1, wherein the operations comprise:
comparing the digitized output electric current data from the electric current values taken at a first time to digitized output electric current data from the electric current values taken at a second time prior to the first time; and
based on the comparison exceeding a threshold value, determining the anomaly in the laser beam based on the digitized output electric current data from the electric current values.

7. The optical energy system of claim 1, wherein the operations comprise:
determining no anomaly in the laser beam; and
based on the determination of no anomaly, maintaining operation of the laser device to output the laser beam.

8. The optical energy system of claim 1, wherein the laser device comprises a linear laser device.

9. An optical energy system, comprising:
a laser device configured to output a laser beam;
an array of a plurality of sensors radially positioned apart from a path of the laser beam, each of the plurality of sensors configured to capture energy scattered from a transversal energy distribution of the laser beam and output an electric current at a value in proportion to the captured energy; and
a control system communicably coupled to each of the sensors and configured to perform operations comprising:
aggregating the output electric currents from the plurality of sensors into a time-dependent array of electric current values;
determining an anomaly in the laser beam based on at least one of (i) a shape of the laser beam, or (ii) digitized output electric current data from the electric current values, the determining comprising:
comparing the digitized output electric current data from the electric current values taken at a first time to digitized output electric current data from the electric current values taken at a second time prior to the first time; and
based on the comparison exceeding a threshold value, determining the anomaly in the laser beam based on the digitized output electric current data from the electric current values; and
controlling the laser device based on the determined anomaly in the laser beam.

10. The optical energy system of claim 9, wherein each sensor comprises a photo-transducer and an optical coupler.

11. The optical energy system of claim 10, wherein each sensor further comprises an optical fiber.

12. The optical energy system of claim 9, wherein the operations comprise digitizing the output electric currents from the plurality of sensors to form the digitized output electric current data.

13. The optical energy system of claim 9, wherein the time-dependent array of electric current values further comprises location values associated with the plurality of sensors.

14. The optical energy system of claim 9, wherein the operations comprise determining the shape of the laser beam.

15. The optical energy system of claim 14, wherein the operation of determining the shape of the laser beam comprises:
   inputting the digitized output electric current data into a Helmholtz solver;
   determining the shape of the laser beam by solving, with the Helmholtz solver, a Helmholtz equation subject to boundary values based on the transversal energy distribution of the laser beam; and
   based on a comparison of the boundary values differing from previous boundary values exceeding a threshold value, determining the anomaly in the laser beam based on the shape of the laser beam.

16. The optical energy system of claim 9, wherein the operations comprise:
   determining no anomaly in the laser beam; and
   based on the determination of no anomaly, maintaining operation of the laser device to output the laser beam.

17. The optical energy system of claim 9, wherein the laser device comprises a linear laser device.

18. A method for operating an optical energy system, comprising:
   operating an optical energy system to generate a laser beam from a laser device, the optical energy system comprising an array of a plurality of sensors radially positioned apart from a path of the laser beam;
   capturing, with each of the plurality of sensors, energy scattered from a transversal energy distribution of the laser beam;
   outputting, from each of the plurality of sensors, an electric current at a value in proportion to the captured energy;
   aggregating, with a laser control system, the output electric currents from the plurality of sensors into a time-dependent array of electric current values;
   determining, with the laser control system, the shape of the laser beam, the determining comprising:
      inputting, with the laser control system, the digitized output electric current data into a Helmholtz solver;
      determining, with the laser control system, the shape of the laser beam by solving, with the Helmholtz solver, a Helmholtz equation subject to boundary values based on the transversal energy distribution of the laser beam; and
      based on a comparison of the boundary values differing from previous boundary values exceeding a threshold value, determining, with the laser control system, the anomaly in the laser beam based on the shape of the laser beam;
   determining, with the laser control system, an anomaly in the laser beam based on at least one of (i) a shape of the laser beam, or (ii) digitized output electric current data from the electric current values; and
   controlling, with the laser control system, the laser device based on the determined anomaly in the laser beam.

19. The method of claim 18, wherein each sensor comprises a photo-transducer and an optical coupler.

20. The method of claim 19, wherein each sensor further comprises an optical fiber.

21. The method of claim 18, further comprising digitizing, with the laser control system, the output electric currents from the plurality of sensors to form the digitized output electric current data.

22. The method of claim 18, wherein the time-dependent array of electric current values further comprises location values associated with the plurality of sensors.

23. The method of claim 18, further comprising:
   comparing, with the laser control system, the digitized output electric current data from the electric current values taken at a first time to digitized output electric current data from the electric current values taken at a second time prior to the first time; and
   based on the comparison exceeding a threshold value, determining, with the laser control system, the anomaly in the laser beam based on the digitized output electric current data from the electric current values.

24. The method of claim 18, further comprising:
   determining, with the laser control system, no anomaly in the laser beam; and
   based on the determination of no anomaly, maintaining operation of the laser device to output the laser beam.

25. The method of claim 18, wherein the laser device comprises a linear laser device.

26. A method for operating an optical energy system, comprising:
   operating an optical energy system to generate a laser beam from a laser device, the optical energy system comprising an array of a plurality of sensors radially positioned apart from a path of the laser beam;
   capturing, with each of the plurality of sensors, energy scattered from a transversal energy distribution of the laser beam;
   outputting, from each of the plurality of sensors, an electric current at a value in proportion to the captured energy;
   aggregating, with a laser control system, the output electric currents from the plurality of sensors into a time-dependent array of electric current values;
   determining, with the laser control system, an anomaly in the laser beam based on at least one of (i) a shape of the laser beam, or (ii) digitized output electric current data from the electric current values, the determining comprising:
      comparing, with the laser control system, the digitized output electric current data from the electric current values taken at a first time to digitized output electric current data from the electric current values taken at a second time prior to the first time; and
      based on the comparison exceeding a threshold value, determining, with the laser control system, the anomaly in the laser beam based on the digitized output electric current data from the electric current values; and
   controlling, with the laser control system, the laser device based on the determined anomaly in the laser beam.

27. The method of claim 26, wherein each sensor comprises a photo-transducer and an optical coupler.

28. The method of claim 27, wherein each sensor further comprises an optical fiber.

29. The method of claim 26, further comprising digitizing, with the laser control system, the output electric currents from the plurality of sensors to form the digitized output electric current data.

30. The method of claim 26, wherein the time-dependent array of electric current values further comprises location values associated with the plurality of sensors.

31. The method of claim 26, further comprising determining, with the laser control system, the shape of the laser beam.

32. The method of claim 31, wherein determining the shape of the laser beam comprises:

inputting, with the laser control system, the digitized output electric current data into a Helmholtz solver;

determining, with the laser control system, the shape of the laser beam by solving, with the Helmholtz solver, a Helmholtz equation subject to boundary values based on the transversal energy distribution of the laser beam; and based on a comparison of the boundary values differing from previous boundary values exceeding a threshold value, determining, with the laser control system, the anomaly in the laser beam based on the shape of the laser beam.

33. The method of claim 26, further comprising:

determining, with the laser control system, no anomaly in the laser beam; and based on the determination of no anomaly, maintaining operation of the laser device to output the laser beam.

34. The method of claim 26, wherein the laser device comprises a linear laser device.

* * * * *